United States Patent [19]

Brezoczky et al.

[11] Patent Number: 5,305,165
[45] Date of Patent: Apr. 19, 1994

[54] TRIBO-ATTRACTIVE CONACT DATA STORAGE SYSTEM

[75] Inventors: Blasius Brezoczky; Hajime Seki, both of San Jose, Calif.

[73] Assignee: International Business Machines Corporation, Armonk, N.Y.

[21] Appl. No.: 814,124

[22] Filed: Dec. 24, 1991

[51] Int. Cl.⁵ .................... G11B 15/64; G11B 5/187
[52] U.S. Cl. .................................. 360/103; 360/122
[58] Field of Search .............. 360/97.01, 103, 104, 360/120, 103, 122

[56] References Cited

U.S. PATENT DOCUMENTS

| | | | |
|---|---|---|---|
| 4,190,872 | 2/1980 | Jones, Jr. et al. | 360/125 |
| 4,816,949 | 3/1989 | Yamada et al. | 360/120 |
| 4,819,091 | 4/1989 | Brezoczky et al. | 360/97.01 |
| 4,849,840 | 7/1989 | Fujioka | 360/104 |
| 4,901,185 | 2/1990 | Kubo et al. | 360/104 |
| 5,159,508 | 10/1992 | Grill et al. | 360/103 |

FOREIGN PATENT DOCUMENTS

| | | | |
|---|---|---|---|
| 0218811A1 | 7/1986 | European Pat. Off. | G11B 5/48 |
| 0227361A3 | 12/1986 | European Pat. Off. | G11B 5/48 |
| 0289259A2 | 4/1988 | European Pat. Off. | G11B 5/48 |
| 58-119541 | 7/1983 | Japan . | |
| 60-074105 | 4/1985 | Japan | G11B 17/32 |
| 62-024420 | 2/1987 | Japan | G11B 5/60 |
| 62-267921 | 11/1987 | Japan | G11B 17/32 |

Primary Examiner—A. J. Heinz
Assistant Examiner—David D. Davis
Attorney, Agent, or Firm—Leslie G. Murray

[57] ABSTRACT

A contact magnetic storage system in which the slider, which supports the magnetic read/write head, is in physical contact with a rigid magnetic storage medium during system operation at a selected operating speed. The slider material has a load versus friction characteristic that is non-linear in the negative load region. This characteristic allows the slider to be suspended from an access arm with zero or negative external loading. In a conventional magnetic storage system, at operating speed the slider is lifted away from the surface of the storage medium by at least the thickness of the air film adjacent the moving storage medium surface. In the present invention, due to the non-linear load versus friction characteristics of the slider material, a restoring force is generated at system operating speed which overcomes the lift of the air bearing and maintains the slider in contact with the storage medium surface without substantial wear or damage to either the slider or the storage medium. Various single crystal, polycrystalline and some amorphous materials have been shown to work in such a contact magnetic storage system.

12 Claims, 4 Drawing Sheets

TRIBO-ATTRACTIVE CONACT DATA STORAGE SYSTEM

BACKGROUND OF THE INVENTION

The present invention relates generally to rotating disk information storage systems and, more particularly, to a magnetic disk storage system in which the magnetic transducer is mounted on a slider in physical contact with the storage medium at an operating speed which utilizes the tribo-attractive effect to maintain the slider in physical contact with the storage medium surface.

In magnetic storage systems, an information bit is stored by focusing a magnetic field to a small volume on the disk to align the magnetic domains in that volume to a desired orientation. In optical storage systems, an information bit is stored by focusing a laser beam onto a small spot on the optical disk to heat the medium and thus effect a physical change in the medium material at that spot. In the case of magneto-optic storage systems, the heat generated by the laser beam causes the magnetic domains at the spot location to be aligned with an applied magnetic field. In all moving disk storage systems, the demand for increased storage capacity is presently being met by increasing the areal bit density on the storage disk.

In magnetic disk storage systems, increase of areal bit density requires the reduction of three basic parameters, the magnetic write transducer (head) gap length, the thickness of the magnetic storage media and the head to disk separation. Given a specified gap length and media thickness, the smaller the head-disk separation, i.e., the lower the head flying height, is, the smaller the bit cell size which can be achieved is. The limit of lower flying height is contact recording, in which the slider is in physical contact with the rotating magnetic disk, i.e., the slider is sliding or rubbing continuously on the disk surface and the read/write transducer is as close as the edge of the slider can be to the disk surface. U.S. Pat. No. 4,819,091 to Brezoczky et al, assigned to the instant assignee, discloses a magnetic contact recording system comprising a magnetic read/write head mounted on a slider fabricated from a single crystal material which is in physical contact with the rotating storage medium. A tribo-attractive force is generated between the moving disk surface and the slider which counteracts the lifting force generated by the moving air layer adjacent the disk surface and which allows contact recording and reading of data without excessive wear to either the magnetic head and slider or the recording medium.

U.S. Pat. No. 4,901,185 to Kubo et al, assigned to Kabushiki Kaisha Toshiba, discloses a rotating magnetic disk storage system wherein a trailing edge of a slider is maintained in contact with the surface of a rotating magnetic disk. The slider is suspended over the rotating disk by a set of gimbal arms which include a leaf spring means to impart a rotational force to the slider to bring a trailing portion of the slider air bearing surface into contact with the moving magnetic disk surface. A magnetic head is located on or embedded in the face of the slider trailing edge with the surface of the magnetic head near to but not in contact with the disk surface to prevent wear of the head surface. Wear of the slider contact surface and the disk is minimized by use of a disk lubricant and reduction of the disk rotational speed.

None of the references disclose a contact data storage system having high speed moving magnetic media and utilizing a slider fabricated of a polycrystalline material which, in conjunction with the moving magnetic media, generates a restoring force allowing the slider to be maintained in physical contact with the disk surface under a zero or negative external load.

SUMMARY OF THE INVENTION

It is the principal objective of the present invention to provide a high density, contact recording system for a moving magnetic storage system in which a tribo-attractive force and a restoring force are generated to maintain the magnetic transducer in contact with the moving recording medium without excessive wear of either the magnetic transducer or the recording medium.

In accordance with the principles of the present invention, an information storage system is provided in which the magnetic read and/or write transducer or head is mounted on a slider suspended from a support arm such that the slider is maintained in physical contact with the moving magnetic storage medium (magnetic disk). Relative motion between the slider and the magnetic disk generates a tribo-attractive restoring force sufficient not only to overcome the lifting force generated by the moving surface film of air, but also to counteract any perturbing force tending to separate the slider from the disk surface. Thus, a very steady average slider-disk separation is maintained, fluctuating within only several nanometers (nm) with respect to the disk surface. At least one magnetic read and/or write head is positioned on the slider in close proximity to the slider contact surface. Since the slider is in contact with the disk surface, the head to media separation is dictated only by the thickness of the protective layers over the magnetic recording layer, i.e., the magnetic medium, and the relative flatness of the magnetic disk. Commercially available, state-of-the- rt magnetic disks have local variances in surface flatness of 20 nm or less and protective overcoat layer thickness of 40 nm or less, if any. Thus, it is relatively easy to achieve head-to-medium distances of less than 60 nm. Additionally, since the slider is in physical contact with the magnetic disk surface, variations in the head height during operation are minimized. Thus, by utilizing a magnetic disk device according to the present invention, the data areal bit density can be significantly increased. In addition, data can be easily read from the magnetic recording surface of the magnetic disk.

Since the tribo-attractive force generated by the relative motion between the slider and the magnetic disk surface in sliding contact overcomes the lift generated by the moving air layer immediately adjacent the disk surface, the requirement for a positive external load on the slider is eliminated. Additionally, because the tribo-attractive force actually behaves in the manner of a restoring force, such as, for example, the restoring force of a spring, any force tending to lift the slider from the disk surface is countered with an increasing tribo-attractive force. Thus, when any disturbing force, for example, resulting from disk asperities or runout, which tends to separate the slider from the disk surface, the tribo-attractive restoring force maintains the slider in contact with the disk surface. Another benefit of this tribo-attractive restoring force is that the slider may be operated with a zero or negative external loading thus providing minimum frictional loading at the slider/disk surface interface minimizing wear at the slider and disk contact surfaces.

Typically, prior art moving magnetic storage systems, Winchester drives, for example, use the "start and stop in contact mode," i.e., when the disk is stationary, the slider rests on the disk surface. When the disk commences rotation, as an air bearing is developed between the slider and the disk surface, the slider "takes off and flies" above the disk surface. When the rotation of the disk is stopped, the slider lands and comes to rest on the disk surface. As disk surfaces become increasingly smooth, an increasing problem of stiction between the slider and the disk surface is being encountered with this mode of operation. This problem is manifested in the requirement for high starting torque of the disk rotation motor to initially "break" the slider loose from its "at rest" condition on the disk surface. This problem is exacerbated by the positive external loading on the slider required to counteract the lifting force created when the disk is rotated. In a moving magnetic storage system according to the present invention, the slider has a zero or slightly positive external loading resulting in the slider being suspended above the disk surface when the disk rotation is stopped; i.e., no relative motion between the slider and the disk. Further, the slider is mounted to its suspension arm such that it is tilted slightly allowing a forward or leading tip or corner to be in very light contact with the disk surface. The stiction forces generated by this point contact are of negligible magnitude and disk rotation is easily started. As rotation is commenced and the disk comes up to its operational speed, the point contact allows the generation of triboelectric charge which propagates over the bottom contact side of the slider. When sufficient charge has been generated over the slider contact surface, the resulting tribo-attractive force pulls the slider down onto the disk surface such that the slider contact surface is parallel to and in physical contact with the disk surface. As described above, as long as the disk continues to rotate above a threshold speed, the slider is maintained in physical contact with the disk surface with zero or slightly negative external loading on the slider. When the disk rotation is ceased, the slider lifts and tilts up again with only the slider forward tip in contact with the disk surface as the disk becomes stationary.

BRIEF DESCRIPTION OF THE DRAWINGS

The foregoing and other objects, features and advantages of the present invention will be apparent from the following detailed description of a preferred embodiment of the invention, reference being made to the accompanying drawings, in which.

DETAILED DESCRIPTION OF THE PREFERRED EMBODIMENTS

Figure 1:
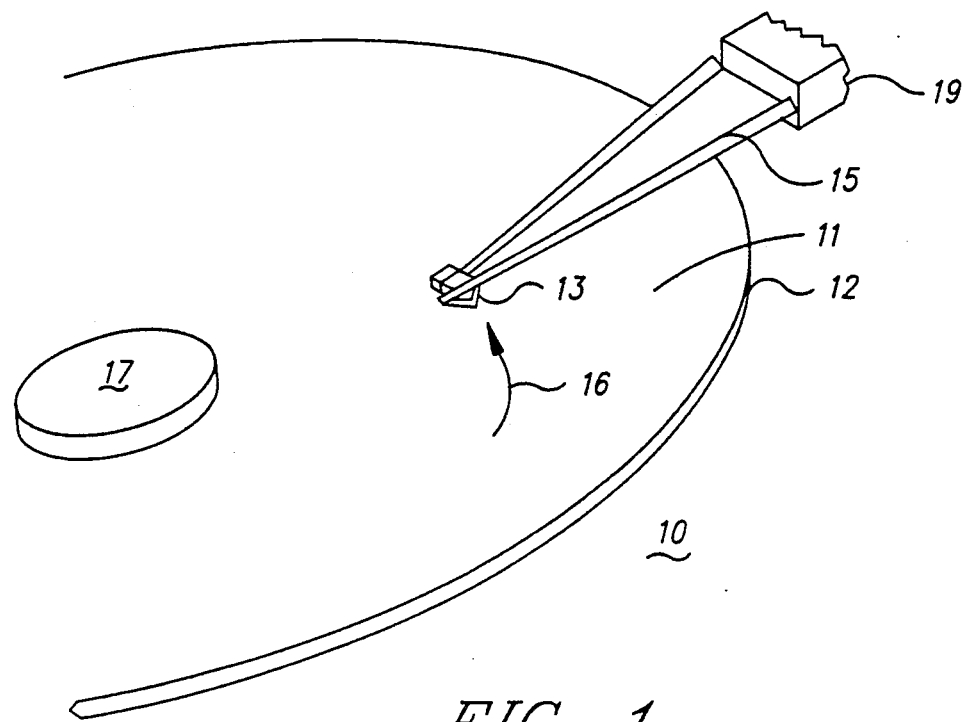
FIG. 1 is a perspective view of a contact slider supported on a rotating storage disk in accordance with the principles of the present invention.

Referring now to FIG. 1, an information storage system comprising at least one rigid storage disk 12 fixedly supported on a spindle 17 and rotated by a disk drive motor (not shown). The recording medium 11 is deposited on the disk in a well-known manner in the form of an annular pattern of concentric data tracks, for example. The storage medium is covered by a protective layer such as a carbon or zirconia overcoat. At least one slider 13 is positioned in contact with the protective overcoat layer at the disk surface and supports one or more read/write heads. The slider 13 is attached to an actuator arm 19 by means of a suspension 15. The actuator arm 19 is attached to an accessing mechanism such as a voice coil motor (not shown) for positioning the read/write heads over desired data tracks. As the storage disk 12 rotates, the slider 13 is moved radially across the disk so that the read/write head may access different portions of the disk surface 11.

In accordance with the present invention, the slider 13 is positioned by the suspension arm 15 so that it is in contact with the recording medium at normal operating speed produced by relative motion between the slider 13 and the disk surface 11 in the direction indicated by arrow 16. It is a feature of the present invention that the slider 13 remains in direct physical contact with the disk surface 11 even when the relative motion between the slider and disk surface exceeds speeds of 20 meters per second. Physical contact is maintained by an attractive force, referred to as a tribo-attractive force, that is of sufficient strength to overcome the lifting force created by the film of air which is moving with the disk surface which tends to force the slider away from the disk surface. The above cited U.S. Pat. No. 4,819,091 discloses in detail a magnetic disk storage system incorporating a slider in physical contact with the storage medium and is hereby incorporated by reference as if fully set forth herein.

Figure 2:
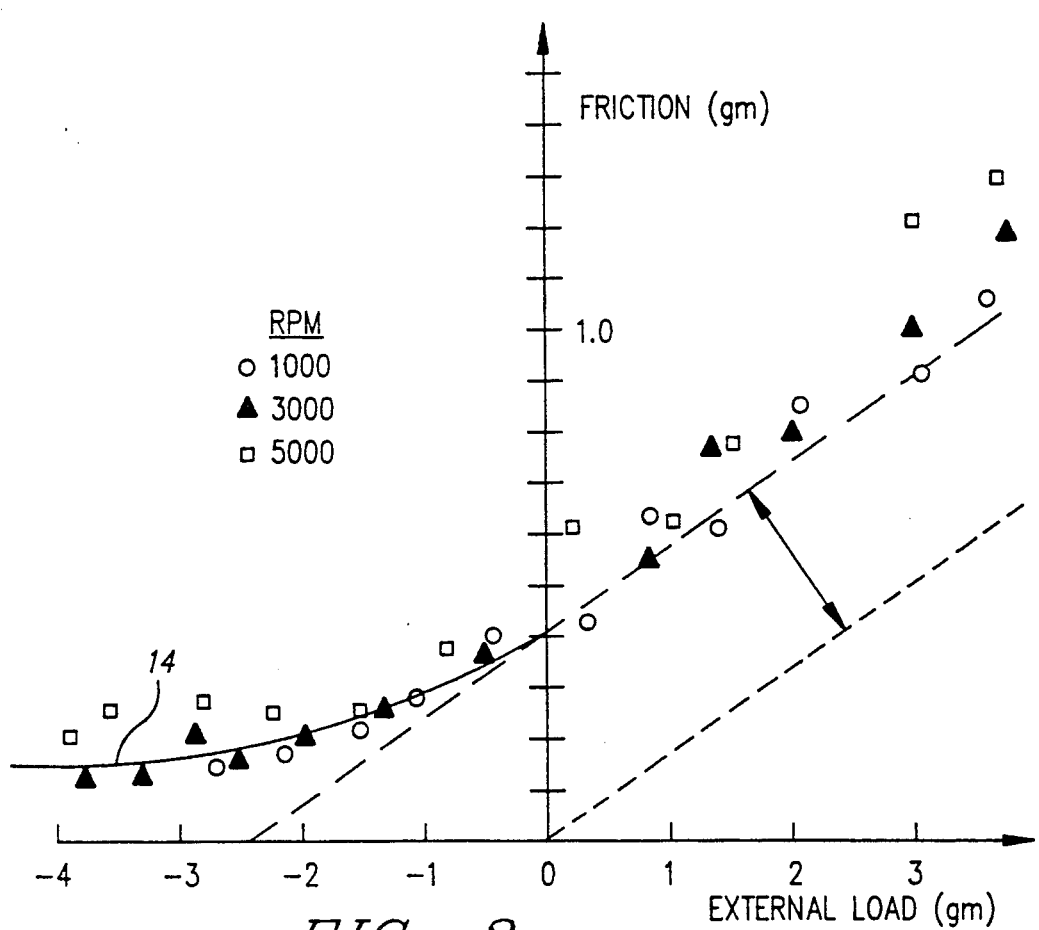
FIG. 2 is a graphical diagram illustrating the frictional force versus external load on a selected slider as shown in FIG. 1.

The tribo-attractive force is due to the coulombic attraction between the triboelectric charge generated as a result of relative motion between the slider and disk surfaces when in physical contact. The triboelectric force is relatively independent of the disk speed above some threshold speed of the order of one meters per second but decreases below this speed. As the speed is reduced, there is a point at which the tribo-attractive force is no longer sufficient to maintain the slider in contact with the disk surface. This point of release appears to be a function of the disk run out and surface roughness. Additionally, as the suspension arm loading, i.e., the external load, on the slider 13 is decreased to a negative load, a "restoring force" is generated. That is, when the two surfaces are forced apart, the tribo-attractive force increases to counteract the force urging the two surfaces apart. This restoring force enables the slider 13 to be maintained in steady contact with the disk surface 11 in spite of the surface roughness and run out of the disk 12. As shown in FIG. 2, when the external load is positive, the actual load on the slider, i.e., the measured friction between the slider and disk surfaces, is linearly proportional to the external load on the slider 13 and there is an additional, constant tribo-attractive force. The net load at the slider-disk interface is the sum of these two forces. As the external load is reduced into the negative region, i.e., the slider is pulled up, away from the disk surface, the net load decreases, being the difference between the tribo-attractive force and the pull on the slider. As illustrated by curve 14 of FIG. 2, as the external load is decreased into the negative region, the friction versus load characteristic gradually deviates from the linear relationship observed at higher loads in the positive load region. As the magnitude of the negative external load on the slider 13 is increased, the net load at the slider disk interface decreases slowly as does the frictional force. The tribo-attractive force is a weak function of the disk speed above a minimum threshold speed. The restoring force effect and the small net load results in increased slider stability and extremely low wear at the slider-disk interface in contact recording systems utilizing the tribo-attractive phenomenon.

The tribo-attractive force generated by the relative motion between the slider and disk contact surfaces includes a restoring force which, in a similar manner to the restoring force of a spring, counters any force tending to separate the slider from the disk surface with an increasing tribo-attractive force. When any perturbing force is applied which tends to separate the slider from the disk, the restoring force thus generated maintains the slider in physical contact with the disk surface. Without the effect of the restoring force, disk surface roughness and disk runout would cause the slider to be separated sufficiently to allow the moving air layer adjacent the disk surface to completely lift the slider from the disk. The net result is that the requirement to apply a large positive force to the slider to counteract the air bearing lift and any perturbing forces is eliminated. Additionally, since the tribo-attractive restoring force generated is only sufficient to counter the perturbing force, no additional load is experienced at the slider/disk contact interface. Thus, the system may be operated with little or no external load on the slider. Optimum system performance is achieved at essentially zero or slightly negative external loading on the slider while the magnetic disk is rotating.

In addition to the material physical characteristics, the extremely low external load on the slider is an important factor in minimizing wear of both the slider and disk contact surfaces and in reducing the effects of stiction. The geometry and surface finish of the slider also play an important role in minimizing wear. While the generated tribo-attractive force is sufficient to counter the lift created by the air bearing, it is also important to minimize the air bearing effect itself as much as practical. However, since the air bearing does provide a beneficial lubricating effect, complete elimination of the air bearing is not desirable.

Whether or not a tribo-attractive force will be generated and the magnitude of the force generated is a function of the materials utilized in the fabrication of the slider and the disk to be used. In view of the present understanding of the triboelectric charging phenomenon, it is difficult to predict material pairs which will exhibit tribo-attractive contact sliding behavior with the restoring force effect. As a general rule, when the friction versus load curve for a pair of materials, slider and disk, has a characteristic shape, particularly in the negative load region, similar to that of curve 14 illustrated in FIG. 2, the materials are showing tribo-attractive contact sliding behavior. The deviation from the linear relationship in the negative load region which results in an extended gradual monotonical decrease in the friction for negative loads is indicative of the development of a strong restoring force. It has been found that slider materials selected from a wide range of crystalline and amorphous materials having a low coefficient of friction and which are either electrically non-conductive or have a high resistivity in combination with presently available magnetic storage disks exhibit the desirable tribo-attractive characteristics. While materials also exhibiting a high thermal conductivity are preferred, a high thermal conductivity does not appear to be required in all materials which exhibit the tribo-attractive effect. Table I is a listing of various slider materials which exhibit tribo-attractive contact sliding effects when used with a variety of magnetic disks, for example, carbon, zirconia or $Si_3N_4$ overcoated thin film disks, plain and carbon overcoated particulate disks and thin film disks with chromium oxide overcoat.

TABLE I

| Material | Morphology* | TA Behavior |
|---|---|---|
| diamond | sc | excellent |
| sapphire | sc | excellent |
| silicon | sc | possible |
| quartz | sc | good |
| cBN | sc | good |
| $CaTiO_3$ | sc | good |
| SiC | HP | some wear |
| ZrO | HP | some wear |
| alumina | HP | some wear |
| SIALON | HP | good |
| cBN | pc | good |
| fused quartz | a | good |

*sc: single crystal, pc: polycrystal, a: amorphous, HP: hot pressed compaction (usually multiphase pc mixture)

As shown in Table I, a wide range of materials are potentially useful in tribo-attractive contact recording applications. While a bleed-off path for the triboelectric charge must be provided, the resistivity of the disk coating is not critical. However, as a general requirement, most of the generated triboelectric charge should be dissipated to ground in the time required for a single disk revolution. Typically, the magnetic media utilized in thin film disks is metallic and if grounded, the protective overcoat is thin enough to allow the charge to dissipate. If the magnetic media is non-conducting, as is the case for some of the commonly used oxides, a deliberate design for bleeding off the triboelectric charge is required. While disk lubricants will decrease friction and enhance the wearability of both the disk and slider, lubricants and other contaminants which may be absorbed will affect both the triboelectric and tribological performance. In practice, the presence of polyether type lubricants have not shown any deleterious effects on the tribo-attractive phenomenon.

Figure 3:
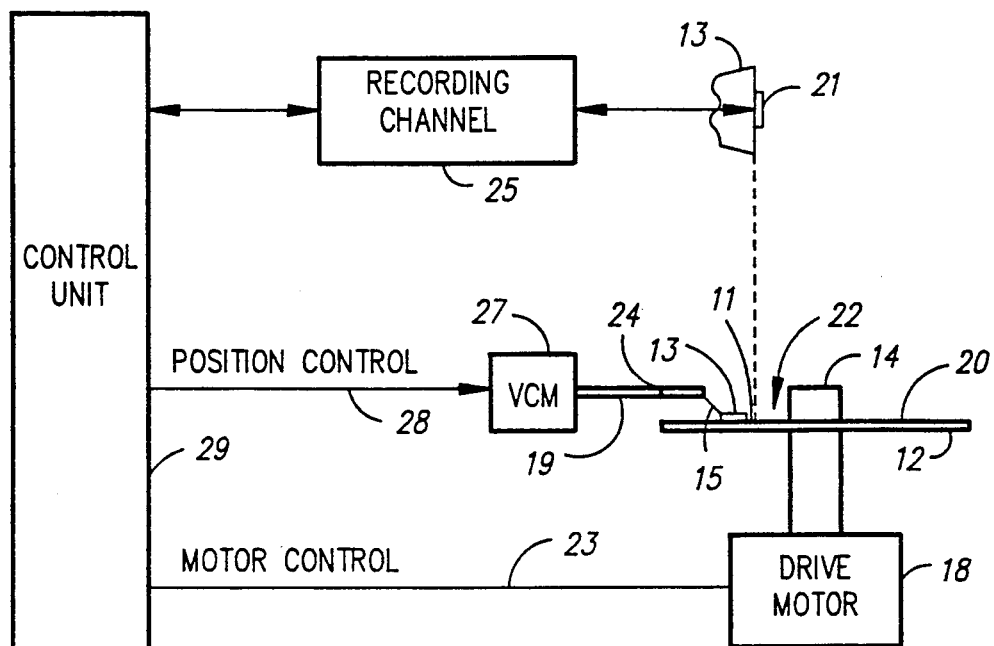
FIG. 3 is a simplified block diagram of a rotating disk magnetic storage system in accordance with the principles of the present invention.

Referring now to FIG. 3, a magnetic disk storage system according to the principles of the present invention is shown. At least one rotatable disk, such as disk 12, is supported on a spindle 14 and rotated by a disk drive motor 18. The magnetic recording medium 11 on each disk is in the form of an annular pattern of concentric data tracks having an inside diameter 22 and an outside diameter 24, as shown on disk 12.

At least one slider 13 is positioned in contact with the magnetic recording medium 11, and each slider 13 supports one or more read/write heads 21. The slider 13 is attached to an actuator arm 19 by means of a suspension arm 15. The suspension arm 15 provides a zero or slightly positive spring force to externally load and maintain the slider 13 in contact with the disk surface 20 when the disk 12 is stationary, i.e., not rotating, as described in more detail below with reference to FIG. 4. When the magnetic disk 12 is rotating, i.e., relative motion exists between the disk 12 and the slider 13, the slider 13 is maintained in contact with the disk surface 20 with a zero or slightly negative external loading. Each actuator arm 19 is attached to an access mechanism such as voice coil motor (VCM) 27, for example. The VCM is a coil movable within a fixed magnetic field; the direction and speed of the coil movement is controlled by an applied current signal. As the disk 12 rotates, the slider 13 is moved radially in and out across the disk so that head 21 may access different portions of the disk surface 20 containing the stored data.

The various components of the disk storage system are controlled in operation by signals generated by control unit 29, such as access control signals and internal clock signals, and which includes logic control circuits, storage means and a microprocessor. The control unit 29 generates control signals to control various system operations such as motor control signals on line 23 and head position control signals on line 28. The control signals on line 28 provide the desired current profiles to optimally move and position a selected slider 13 to the desired data track on the associated disk 12. Read and write signals are communicated to and from read/write head 17 by means of recording channel 25.

The above description of a magnetic disk storage system, and the accompanying illustration of it in FIG. 3, are intended for illustrative purposes only. It should be apparent that such storage systems may contain a large number of storage disks and VCMs and that each actuator arm may support a number of sliders. The present invention of a contact recording magnetic disk storage system is fully applicable to any such movable storage apparatus, provided it is of the type in which the sliders are in contact with the storage medium when at operating speed.

Figure 4:
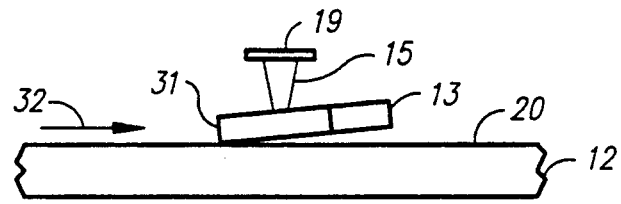
FIG. 4 is a cross-sectional view illustrating a slider mounted for self-loading in accordance with the principles of the present invention.
Figure 5:
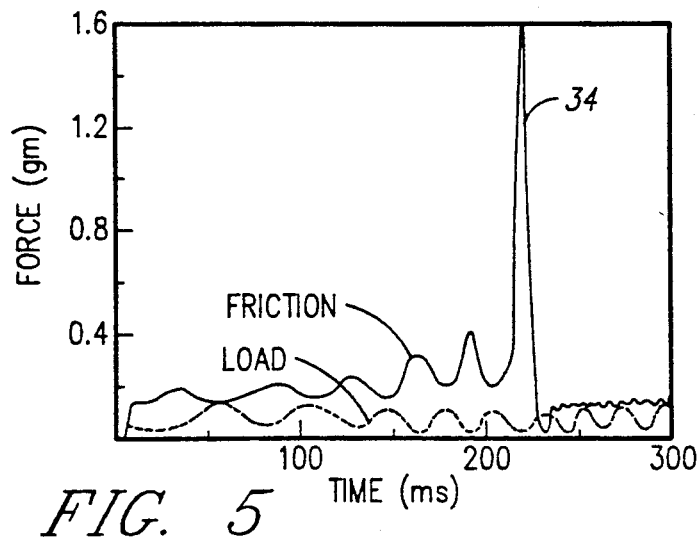
FIG. 5 is a graph showing the slider load and friction forces as a function of time as the disk commences rotation for the magnetic storage system shown in FIGS. 3 and 4.

Referring now to FIGS. 4 and 5, in accordance with the principles of the present invention, the slider 13 is attached to a suspension arm 15 and positioned such that it is suspended in contact with the disk surface 20 when the disk 12 is stationary or stopped. The slider 13 is further mounted to suspension arm 15 oriented such that the slider is slightly tilted, such as by twisting suspension arm 15 slightly, and a forward or leading corner 31 with respect to the disk rotation (as indicated by arrow 32) is in light contact with the disk surface 20 when the disk 12 is stopped. The tilt angle, while exaggerated in the drawing for illustrative purposes, need be only enough to ensure contact of the slider tip 31 with the disk surface 20. For a preferred embodiment, a tilt angle in the range between 1.5-5.0 degrees is sufficient. Too large a tilt angle may cause the slider tip 31 to "dig in" to the disk surface when disk rotation is started. The stiction forces generated by this light contact are of negligible magnitude and the disk rotation is easily started With this configuration, as rotation is commenced and the disk 12 comes up to its operational speed, the point contact of corner tip 31 allows the generation of triboelectric charge which propagates over the bottom or contact surface of slider 13. As the charge generated at the corner tip 31 begins to spread, the slider 31 is increasingly attracted to the disk surface 20. This process enhances the triboelectric charge generation due to the increasing contact area and at a threshold point, sufficient charge has accumulated for the slider to be suddenly attracted and pulled to the disk such that the slider contact surface is parallel to and in substantially physical contact with the disk surface 20. As long as the disk continues to rotate at a sufficient speed, the slider is maintained in sliding contact with the disk with zero or slightly negative external loading. When the disk rotation is ceased, the slider 13 lifts and tilts up to its rest position with the corner tip 31 again in contact with the disk surface 20 at its original angle The slider self-loading process is illustrated graphically in FIG. 5 as a function of time. The disk rotation is seen to start at the left side of the graph at time zero. As the rotational speed of the disk increases, the friction increases while the load remains relatively constant. The oscillations of both the friction and load magnitudes are due to repeatable runout of the disk and the gradual acceleration of the disk as evidenced by the shortening of the period of oscillation. The large spike 34 in the friction curve is indicative of the point when the slider has accumulated sufficient charge to be attracted into full contact with the disk surface. For a preferred embodiment comprising a single-crystal sapphire slider with a 3.5 inch particulate magnetic disk, the friction spike 34 corresponds to about 2400 rpm in a system where the final rotational speed was 3600 rpm. After the high friction spike 34, when the slider initially comes into contact with the disk surface 20, the friction curve flattens out at a value approximately equal to the lower value for the load. In contrast, the load curve continues its oscillatory behavior. This is most likely due to the fact that the contact sliding occurs in the nonlinear region of the friction versus load curve where the derivative with respect to the load is small.

Figure 6:
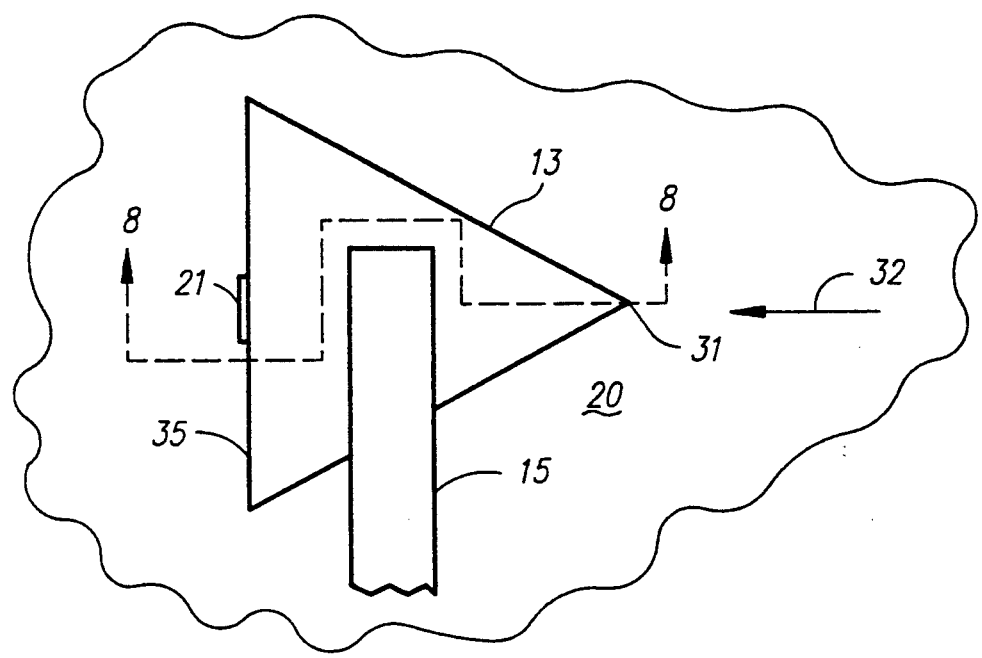
FIG. 6 is a top plan view illustrating a preferred embodiment of a contact slider for use in the system shown in FIG. 4.
Figure 7:
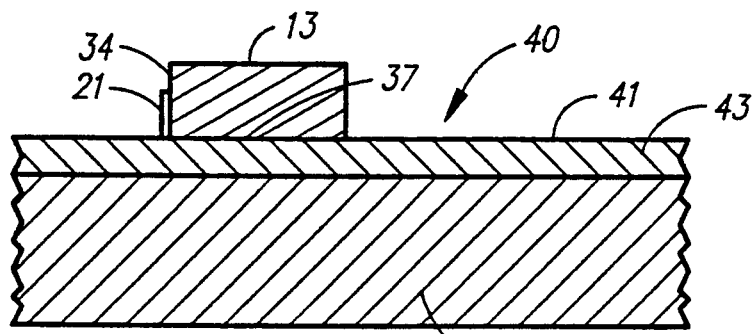
FIG. 7 is a cross-sectional view taken along lines 7—7 of the slider shown in FIG. 6.
Figure 8:
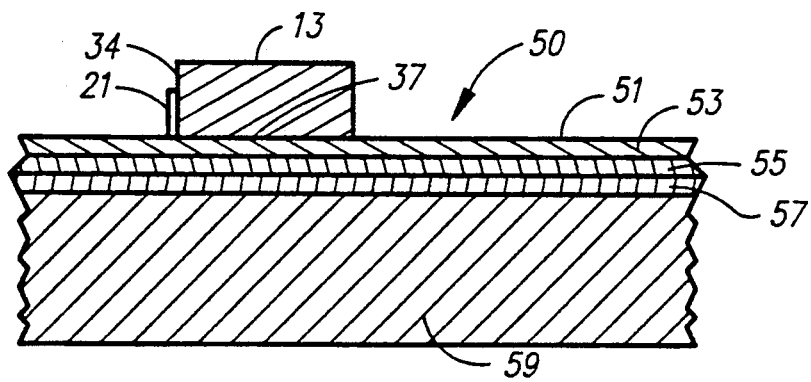
FIG. 8 is a cross-sectional view of the slider shown in FIG. 7 with an alternate embodiment of the recording medium.

Referring now to FIGS. 6-8, in accordance with the present invention, the slider 13 is positioned such that it is in sliding contact with the recording medium 11 while the disk is at normal operating speed produced by relative motion, at a predetermined rate, between slider 13 and the disk surface 20 in the direction indicated by arrow 32. A "snow plow" or "boat-like" slider geometry is utilized to deflect surface particles, and, thus, minimize the possibility of dust and other contamination coming between the slider and the disk surface. In a preferred embodiment, the slider 13 is formed in the shape of an isosceles triangle with apex or leading corner tip 31 along the line of relative motion (as indicated by arrow 32), which may be 3600 rpm or greater. The slider bottom side or contact surface is flat and lapped to at least an optically flat surface. Alternatively, the slider 13 may be an equilateral triangle or a square or rectangular shape mounted such that a leading corner tip is directed against the disk rotation direction.

The slider 13 is fabricated of a material having suitable tribo-attractive properties, such as a material selected from the materials listed in Table I, for example. Single crystal diamond or sapphire are suitable materials for slider 13. In a preferred embodiment, slider 13 is fabricated of a polycrystalline compact of silicon carbide (SiC). While the SiC compact exhibits excellent tribo-attractive properties, it does not wear as well as sapphire or diamond with respect to the disk surface. In general, single crystal surfaces provide better performance because they present uniform surface properties resulting in consistent triboelectric charging and wear. However, the increased expense of single crystal materials such as diamond over polycrystalline materials may not justify the increased wear performance.

The magnetic read/write head 21 preferably comprises a magnetic head formed by thin film deposition techniques such as the thin film transducer described in commonly assigned U.S. Pat. No. 4,190,872 to Jones, Jr. et al, for example. The magnetic read/write head 21 is deposited on the face 34 of trailing edge 35 of the slider 13 which is substantially normal to the bottom surface 37 of the slider which is in contact with the disk surface 20 (as shown in FIG. 7).

As shown in FIG. 7, in a specific embodiment, the recording medium 40 is a particulate magnetic disk. The recording medium 30 comprises a substrate 45 made of an aluminum alloy, for example, having a particulate magnetic coating 43 thereon. The magnetic coating comprises magnetic particles in an epoxy-resin binder. The magnetic coating is cured and buffed to a desired surface finish and a small quantity of a liquid lubricant, for example, is deposited on surface 41 of the recording medium. The slider 13 then is positioned in sliding contact with the disk surface 41, the lubricant forming an interface between the slider contact surface 37 and the recording medium surface 41. The read/write head 21 deposited on the rear face 34 of the slider is therefore maintained in close proximity to the disk surface 41 at a substantially constant height above the recording medium 43.

As shown in FIG. 8, in another preferred embodiment the recording medium 50 is a thin film magnetic disk. The recording medium 50 comprises a substrate 59 made of an Al-Mg alloy, for example, an undercoat 57 of material such as chromium, for example, a magnetic layer 55 of a cobalt-based alloy, for example, and a protective overcoat 53 of a material such as carbon. As described above, the slider 13 is positioned in contact with the surface 51 of the recording medium 50 under normal operating conditions of a magnetic disk storage system without producing excessive wear.

Figure 9:
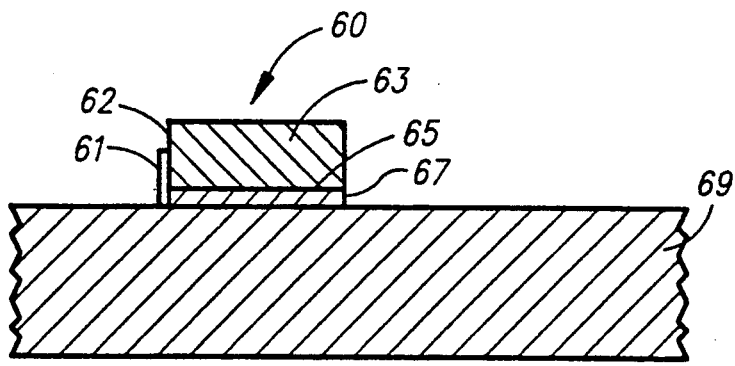
FIG. 9 is a cross-sectional view of another preferred embodiment of the slider shown in FIG. 4.

Referring now to FIG. 9, a preferred embodiment of a composite slider is shown. A composite slider 60 comprises a slider body 63 which is made of a suitable material such as a ceramic, a mixture of $Al_2O_3$ and TiC, for example, and a thin layer 67 of a suitable tribo-attractive material bonded to the slider body bottom surface 65 and in contact with the recording medium 69. In a specific embodiment, a composite slider 60 comprises a slider body 63 of single crystal sapphire upon which is deposited a layer 67 of suitable crystalline material. As described above, a magnetic read/write head 61 is deposited on the face 62 at the slider trailing edge. A layer 67 having a thickness of about 250Å is suitable to provide the tribo-attractive characteristics required to ensure contact between the bottom surface 65 of slider 60 and the recording medium 69.

While the invention has been particularly shown and described with reference to various preferred embodiments thereof, it is understood by those skilled in the art that the invention is not to be limited to the disclosed embodiments, but that various modifications in the form and details may be made therein without departing from the spirit and scope of the appended claims.

We claim:

1. A magnetic disk storage system comprising:
    a magnetic storage medium comprising a rigid substrate having a layer of magnetic storage material thereon;
    a magnetic transducer and a contact slider for supporting said magnetic transducer in physical contact with said magnetic storage medium, said contact slider comprising an amorphous fused quartz having a high resistivity and a low coefficient of friction and a load versus friction characteristic that is non-linear in the negative load region; and
    means coupled to said magnetic storage medium for rotating said magnetic storage medium and producing relative motion between said magnetic storage medium and said contact slider up to a selected operating speed sufficient to generate a restoring force responsive to said load versus friction characteristic of said contact slider, said restoring force having a magnitude sufficient for maintaining a surface of said contact slider in substantially physical contact with said magnetic storage medium at said selected operating speed, whereby said magnetic transducer is maintained in close proximity to said magnetic storage medium and data can be written or sensed without excessive ear to either said contact slider or said magnetic storage medium.

2. A magnetic disk storage system as in claim 1 further comprising an access arm and suspension means for suspending said contact slider in substantially physical contact with said magnetic storage medium at said selected operating speed.

3. A magnetic disk storage system as in claim 2 wherein said suspension means includes spring means adapted for providing a negative external force on said contact slider when said magnetic storage medium is rotating, said negative external force urging said contact slider away from the surface of said magnetic storage medium, said negative external force being of a magnitude such that said contact slider is maintained in substantially physical contact with said magnetic storage medium at said selected operating speed and said contact slider is suspended in spaced relationship adjacent said magnetic storage medium when said magnetic storage medium is stationary.

4. A magnetic disk storage system as in claim 3 wherein said suspension means includes means for orienting said contact slider such that a portion of said contact slider is in physical contact with said magnetic storage medium when said magnetic storage medium is stationary.

5. A magnetic disk storage system as in claim 4 wherein said contact slider comprises a shaped slider having a flat bottom surface and a leading tip with respect to the direction of rotation of said magnetic storage medium, said shaped slider suspended at a predetermined angle such that said leading tip is in physical contact with said magnetic storage medium when said magnetic storage medium is stationary.

6. A magnetic disk storage system as in claim 55 wherein said predetermined angle is in the range between 1.5 degrees and 5.0 degrees with respect to the surface of said magnetic storage medium.

7. A magnetic disk storage system as in claim 1 further comprising an access arm including suspension means adapted for providing a substantially zero external load on said contact slider.

8. A magnetic disk storage system as in claim 1 further comprising an access arm including suspension means adapted for providing a negative external load on said contact slider when said magnetic storage medium is rotating.

9. A magnetic disk storage system as in claim 8 wherein said suspension means comprises twisted spring means adapted for maintaining said contact slider suspended in spaced relationship adjacent the surface of said magnetic storage medium when said magnetic storage medium is stationary, said contact slider disposed in a tilted orientation with respect to said magnetic storage medium, a portion of said contact slider being in physical contact with the surface of said magnetic storage medium when said magnetic storage medium is stationary.

10. A magnetic disk storage system as in claim 9 wherein said contact slider is oriented such that a leading tip portion with respect to the direction of rotation of said magnetic storage is maintained in physical contact with the surface of said magnetic storage medium when said magnetic storage medium is stationary.

11. A magnetic disk storage system as in claim 1 wherein said magnetic storage medium comprises a particulate magnetic disk.

12. A magnetic disk storage system as in claim 1 wherein said magnetic storage medium comprises a thin film magnetic disk.

* * * * *

UNITED STATES PATENT AND TRADEMARK OFFICE
CERTIFICATE OF CORRECTION

PATENT NO. : 5,305,165

DATED : April 19, 1994

INVENTOR(S) : B. Brezoczky et al.

It is certified that error appears in the above-indentified patent and that said Letters Patent is hereby corrected as shown below:

On the title page, item [54] and column 1, line 2, delete "CONACT", insert --CONTACT--.

Column 10, line 28, delete "ear", insert --wear--.

Signed and Sealed this

Twenty-fifth Day of October, 1994

Attest:

BRUCE LEHMAN

Attesting Officer

Commissioner of Patents and Trademarks